US008512127B2

(12) United States Patent
Jaffe et al.

(10) Patent No.: US 8,512,127 B2
(45) Date of Patent: Aug. 20, 2013

(54) WAGERING GAME WITH ALTERED PROBABILITIES BASED ON REEL STRIP CONFIGURATIONS

(75) Inventors: Joel R. Jaffe, Glenview, IL (US); Daniel P. Louie, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 215 days.

(21) Appl. No.: 13/026,955

(22) Filed: Feb. 14, 2011

(65) Prior Publication Data

US 2011/0201406 A1 Aug. 18, 2011

Related U.S. Application Data

(60) Provisional application No. 61/304,878, filed on Feb. 16, 2010.

(51) Int. Cl.
*G06F 19/00* (2011.01)

(52) U.S. Cl.
USPC .................. 463/21; 463/16; 463/20; 463/25; 273/292

(58) Field of Classification Search
USPC .......................... 463/16, 20, 21, 25; 273/292
See application file for complete search history.

(56) References Cited

U.S. PATENT DOCUMENTS

| | | | | |
|---|---|---|---|---|
| 7,850,519 B2 | 12/2010 | Majima et al. | 463/20 |
| 2004/0048646 A1* | 3/2004 | Visocnik | 463/16 |
| 2007/0060245 A1* | 3/2007 | Veenker | 463/16 |
| 2008/0108411 A1* | 5/2008 | Jensen et al. | 463/20 |
| 2008/0139289 A1 | 6/2008 | Okada | 463/20 |
| 2008/0146319 A1* | 6/2008 | Yoshizawa | 463/21 |
| 2009/0215519 A1 | 8/2009 | Yoshizawa | 463/20 |
| 2009/0215520 A1 | 8/2009 | Yoshizawa | 463/20 |
| 2009/0233689 A1 | 9/2009 | Saito | 463/20 |

FOREIGN PATENT DOCUMENTS

WO WO 2009-139267 A1 11/2009

OTHER PUBLICATIONS

Examiner's first report on patent application No. 2011200521 mailed Mar. 7, 2012 which issued in corresponding Australian Patent Application No. 2011200521 (3 pages).
Third Party Submission, dated Oct. 18, 2011, 3 pages.

* cited by examiner

*Primary Examiner* — Omkar Deodhar
*Assistant Examiner* — Adetokunbo O Torimiro
(74) *Attorney, Agent, or Firm* — Nixon Peabody LLP

(57) ABSTRACT

A gaming system for playing a wagering game includes a display configured to displaying a wagering game outcome on a plurality of video reels and a controller in communication with the display. The controller is operative to randomly determine an outcome of the wagering game and to display the wagering game outcome on the plurality of reels. The wagering game outcome includes a plurality of symbols disposed on a first subset of the plurality of reels and further includes at least one meta-symbol disposed on a second subset of the plurality of reels. The controller is further operative to award an award if the displayed wagering game defines a winning wagering game outcome.

20 Claims, 17 Drawing Sheets

WAGERING GAME WITH ALTERED PROBABILITIES BASED ON REEL STRIP CONFIGURATIONS

REFERENCE TO RELATED APPLICATIONS

This application is related to and claims priority to U.S. Provisional Patent Application Ser. No. 61/304,878, filed Feb. 16, 2010, and titled "Wagering Game With Altered Probabilities Based On Reel Strip Configurations," which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, particularly reel-based wagering games.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

When conducting a wagering game, a player receives an individual award if a winning outcome is achieved. For example, in a traditional reel-based wagering game, a winning outcome is achieved if a particular, predetermined combination of symbols occurs on the reels along an active payline upon which a player has lodged a wager. The award corresponding to that predetermined combination of symbols and often the level of the wager itself along the associated active payline is then awarded to the player.

Konami Digital Entertainment, Inc. (KDEI), a subsidiary of Konami Corporation, of Tokyo, Japan, manufactures a video slot machine named "Rawhide"™. This slot machine retains a predetermined plurality of adjacent symbol positions on a reel strip as undefined and, following the player's pressing of the spin button, a single symbol is randomly assigned to each of the symbol positions in that predetermined plurality of undefined adjacent symbol positions. Thus, when the reel stops, each of the displayed symbol positions of a reel then display a common symbol, such as "Q."

SUMMARY OF THE INVENTION

According to one aspect of the present invention, a method is provided for conducting a wagering game on a gaming system configured to display a wagering game outcome on a plurality of reels associated with a gaming system display. The method comprises the acts of receiving a wager via a wager input and, using one or more processors, randomly determining the wagering game outcome. The method also comprise the act of using the one or more processors, or another processor, to display the wagering game outcome on the plurality of reels. The wagering game outcome comprises a plurality of symbols disposed on a first subset of the plurality of reels and further comprising at least one meta-symbol disposed on a second subset of the plurality of reels. The method further comprises the act of awarding an award if the displayed wagering game defines a winning wagering game outcome.

According to yet another aspect of the invention, computer readable storage media is encoded with instructions for directing a gaming system to perform the above method.

According to another aspect of the invention, a gaming system comprise a display configured to displaying a wagering game outcome on a plurality of video reels and a controller in communication with the display, the controller being operative to randomly determine an outcome of the wagering game, display the wagering game outcome on the plurality of reels, the wagering game outcome comprising a plurality of symbols disposed on a first subset of the plurality of reels and further comprising at least one meta-symbol disposed on a second subset of the plurality of reels, and award an award if the displayed wagering game defines a winning wagering game outcome.

In still another gaming system for playing a wagering game, the gaming system comprises a video display configured to displaying a wagering game outcome comprising a plurality of symbol positions bearing symbols and a controller in communication with the display. The controller is operative to receive a wagering input, alter the video display to increase or decrease a number of displayed symbol positions in correspondence with the wagering input, randomly determine an outcome of the wagering game for the displayed symbol positions, display the wagering game outcome, and award an award for any indicated winning wagering game outcome.

In another aspect of the present concepts, a gaming system for playing a wagering game includes a video display configured to displaying a wagering game outcome comprising a plurality of symbol positions bearing symbols and a controller in communication with the display. The controller is operative to receive a wagering input, alter the number of reels in play in the wagering game to increase or decrease a number of reels displayed on the display in correspondence with the wagering input, randomly determine an outcome of the wagering game for the displayed reels, display the wagering game outcome, and award an award for any indicated winning wagering game outcome.

In yet another aspect of the present concepts, a gaming system for playing a wagering game includes a display configured to displaying a wagering game outcome on a plurality of reels and a controller in communication with the display. The controller is operative to randomly determine an outcome of the wagering game and display the wagering game outcome on the plurality of reels. The wagering game outcome comprising a plurality of symbols disposed on a first subset of the plurality of reels and further comprising at least one meta-symbol disposed on a second subset of the plurality of reels, the second subset of reels comprising a plurality of adjacent reels spinning and stopping synchronously with the at least one meta-symbol spanning at least one symbol position on each reel in the second subset of reels. The controller is also operative to award an award if the displayed wagering game defines a winning wagering game outcome.

Additional aspects of the invention will be apparent to those of ordinary skill in the art in view of the detailed description of various embodiments, which is made with reference to the drawings, a brief description of which is provided below.

Figure 1:
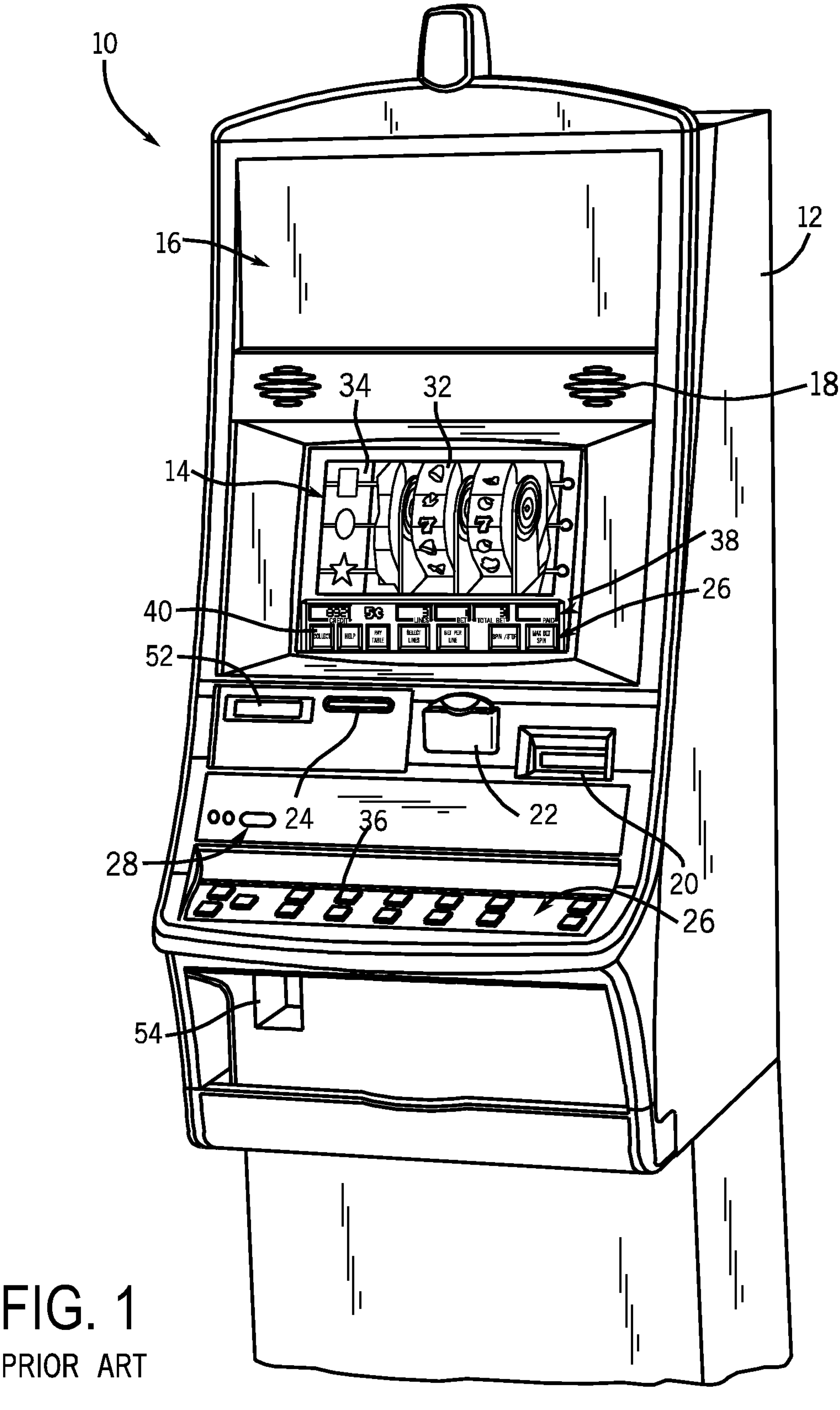
FIG. 1 PRIOR ART
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
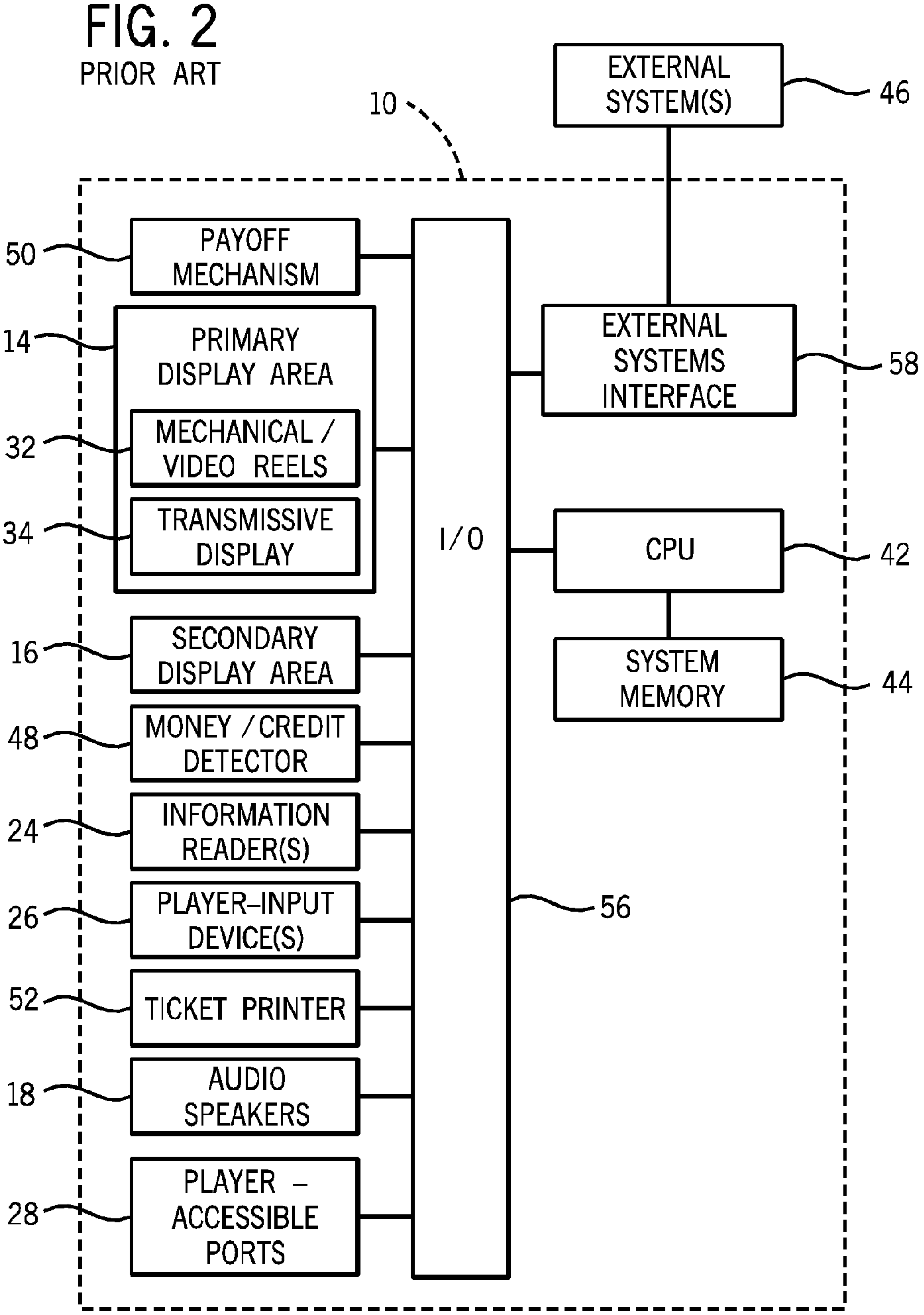
FIG. 2 PRIOR ART
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either a RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
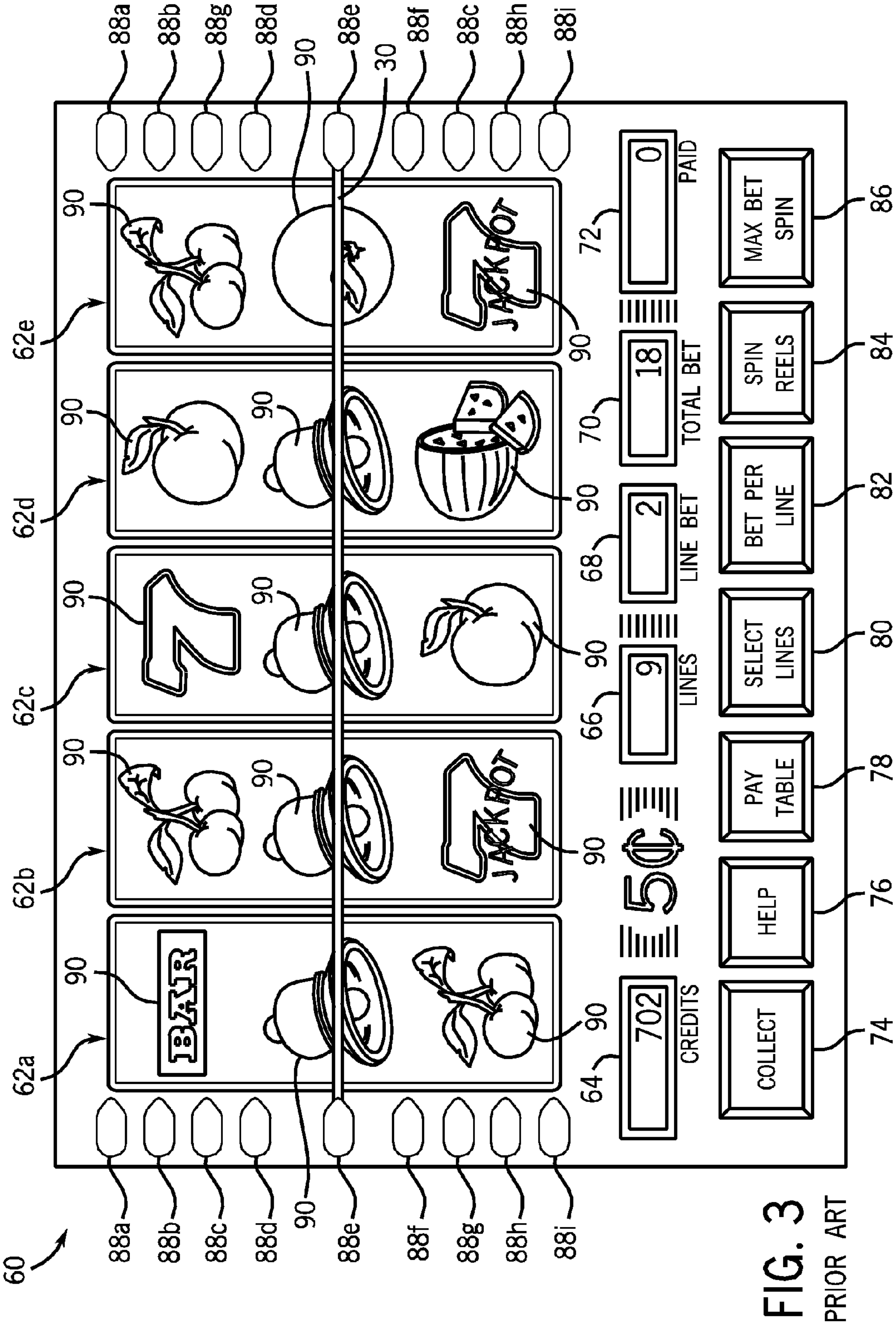
FIG. 3 PRIOR ART
FIG. 3 is an image of an exemplary basic-game screen of a wagering game displayed on a gaming terminal.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a*-62*e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
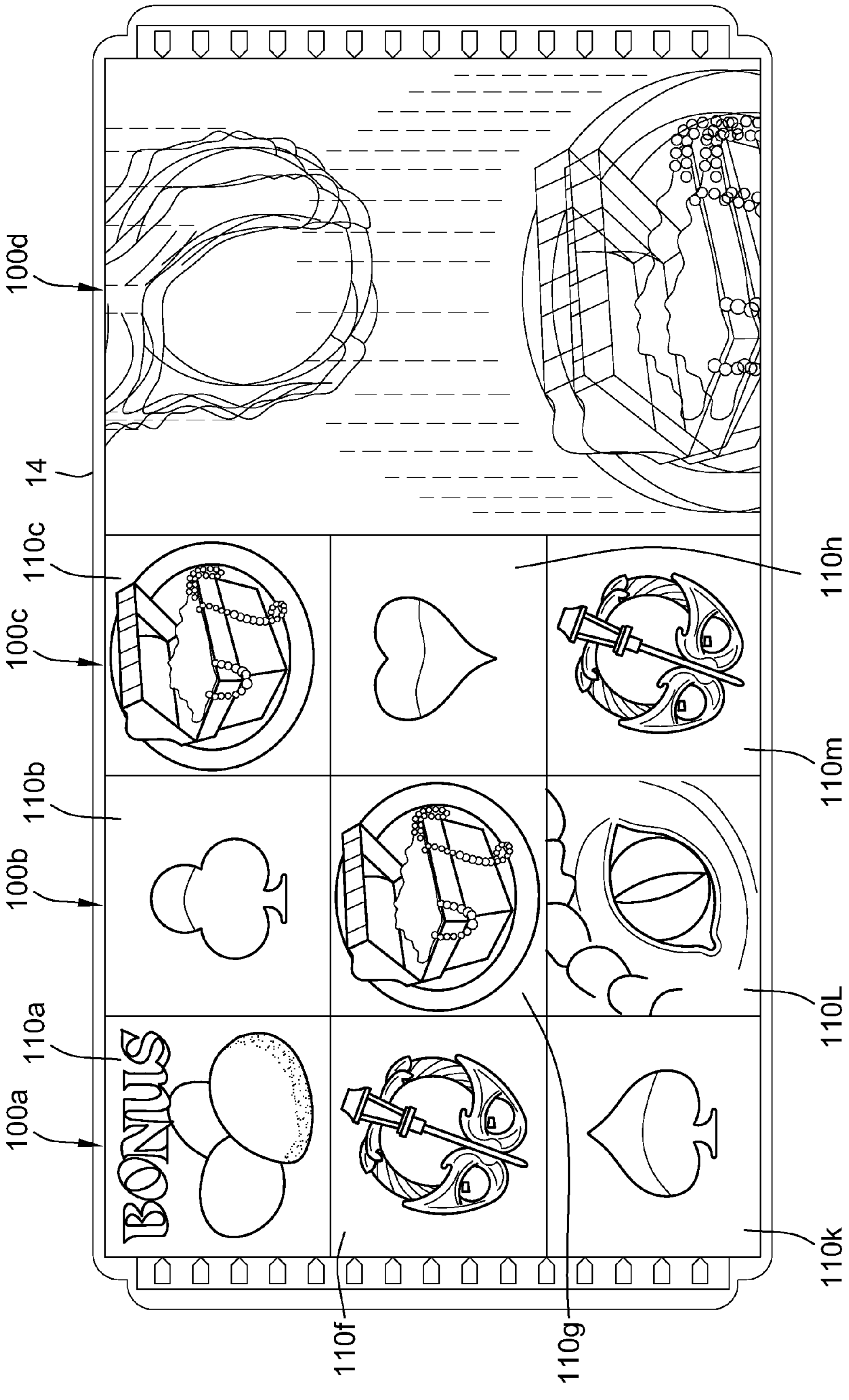
FIG. 4 is an image of an exemplary wagering game screen of a wagering game displayed on a gaming terminal, wherein some reels are stopped and a reel or reels are in motion, depicting at least some aspects of an embodiment according to the present concepts.
Figure 5:
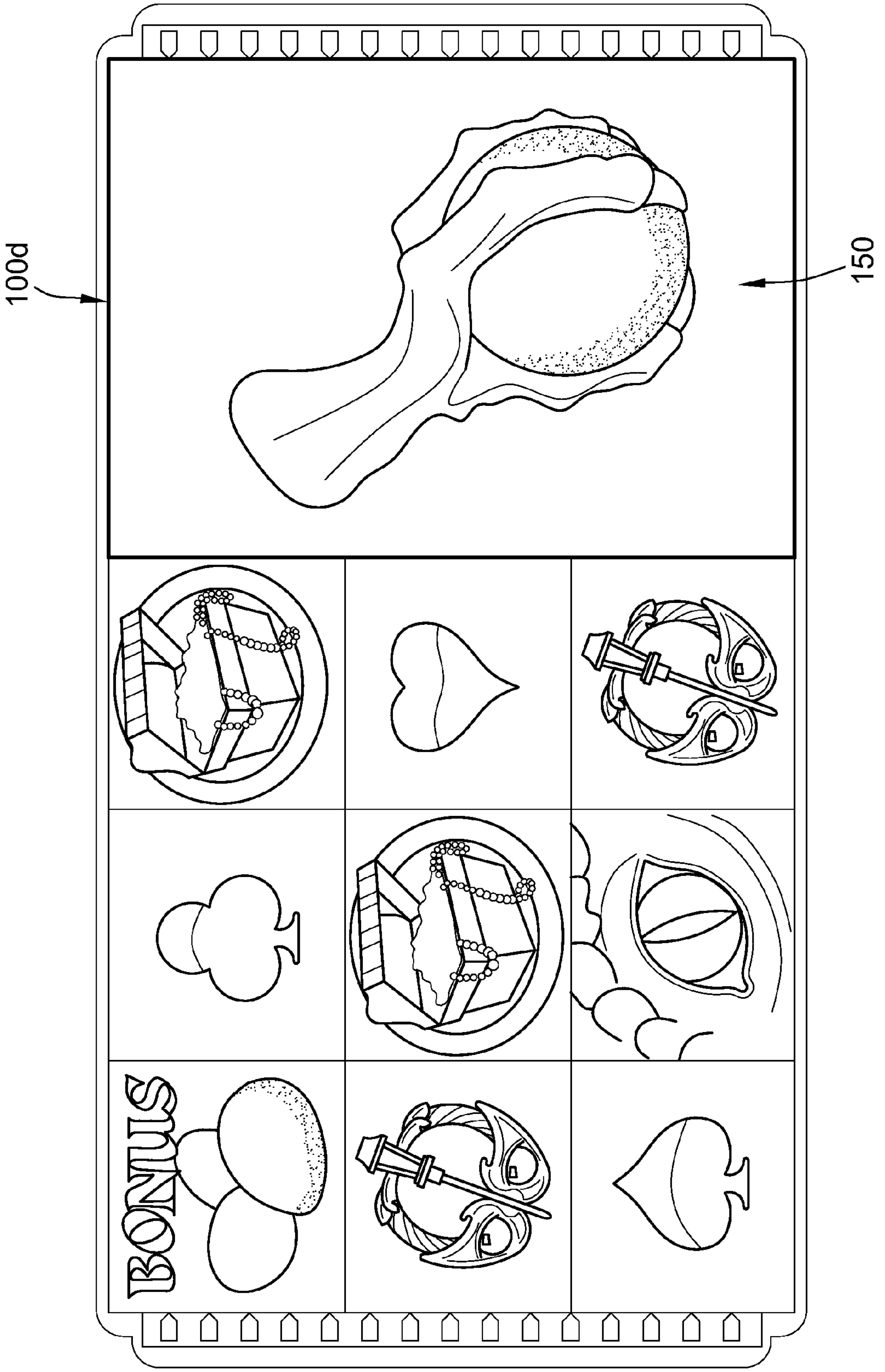
FIG. 5 is an image of the wagering game represented in FIG. 4 following completion of the depicted wagering game.

Referring to FIG. 4, the gaming terminal 10 primary display 14 shows three reels 100*a*-100*c*, which may be physical reels or video reels, in a stopped position, whereas reel 100*d* is in motion, as is represented by the blurred symbols. Reel 100*a* shows a "BONUS" symbol in symbol position 110*a*, a "BROOCH" symbol in symbol position 110*f*, and a "SPADE" symbol in symbol position 110*k*. Reel 100*b* shows a "CLUB" symbol in symbol position 110*b*, a "TREASURE" symbol in symbol position 110*g*, and a "EYE" symbol in symbol position 110*l*. Reel 100*c* shows a "TREASURE" symbol in symbol position 110*c*, a "HEART" symbol in symbol position 110*h*, and a "BROOCH" symbol in symbol position 110*m*. The aforementioned symbols are all conventional symbols in that each symbol occupies a single symbol position. Reel 100*d*, on the other hand, is an enlarged reel, as depicted, and the meta-symbols borne thereby are also enlarged symbols sized generally proportionally to the enlarged reel. In the blurred image (representing motion of the reel) of reel 100*d*, in FIG. 4, a "CLAW" meta-symbol is shown moving at the top portion of the reel and a "TREASURE" meta-symbol is shown moving at the bottom portion of the reel. The meta-symbol is described in more detail below. FIG. 5 shows that reel 100*d* stopped to reveal the "CLAW" meta-symbol 150, the meta-symbol being described further below.

Figure 15:
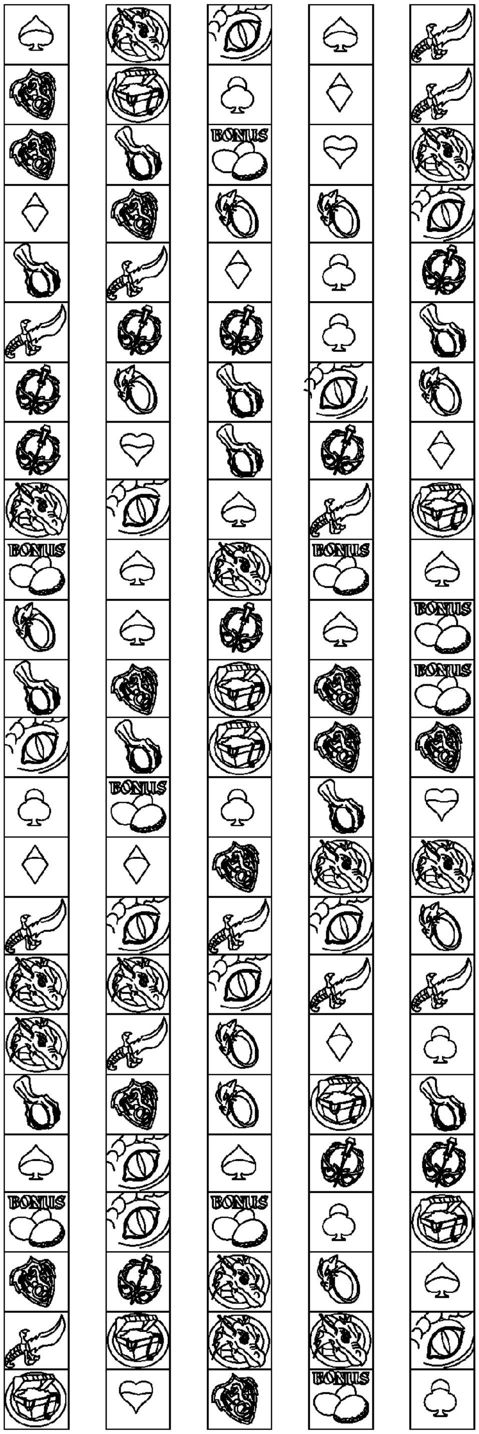
FIG. 15 is a representation of conventional reel strips using symbols depicted in association with other drawings herein.
Figure 16:
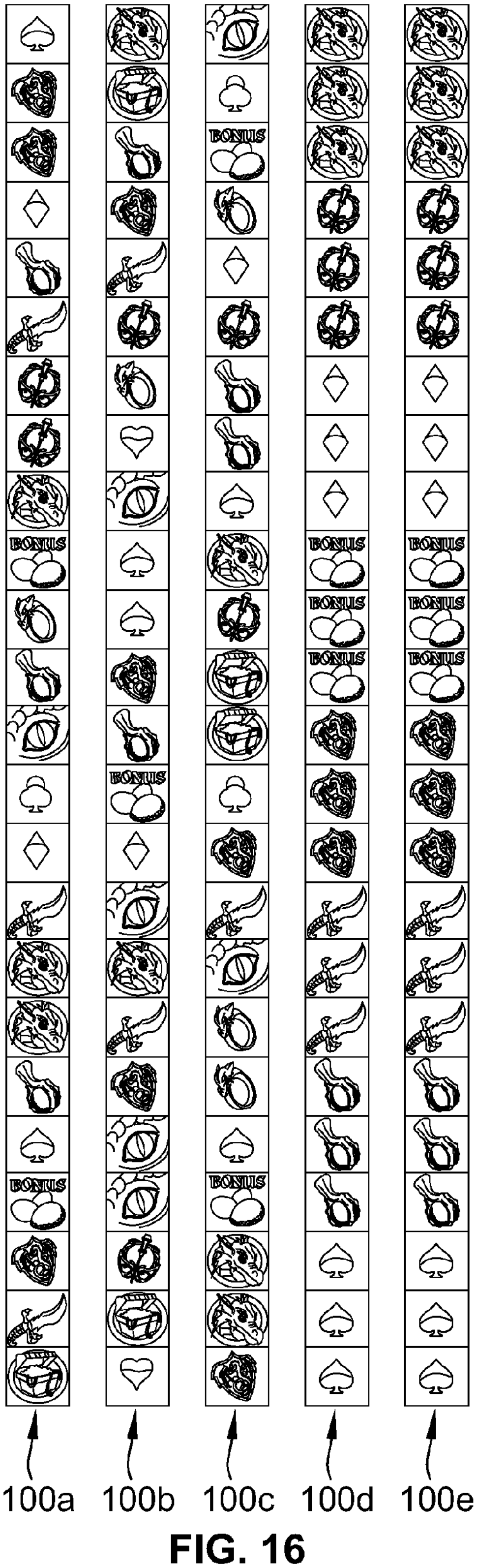
FIG. 16 is an image of a representation of an example of reel strips depicting at least some aspects of an embodiment according to the present concepts.
Figure 17:
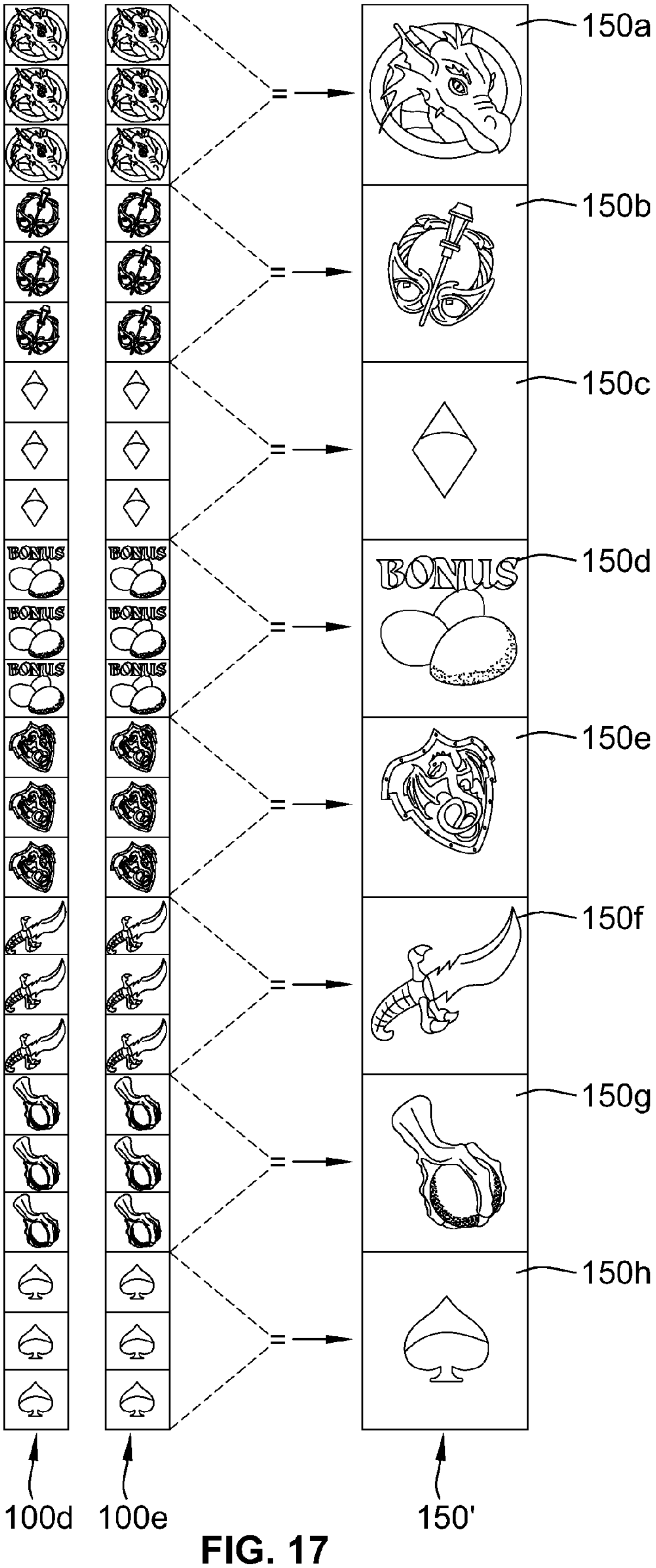
FIG. 17 is an image of a representation of the example of reel strips shown in FIG. 16, further depicting at least some aspects of an embodiment according to the present concepts.
Figure 18:
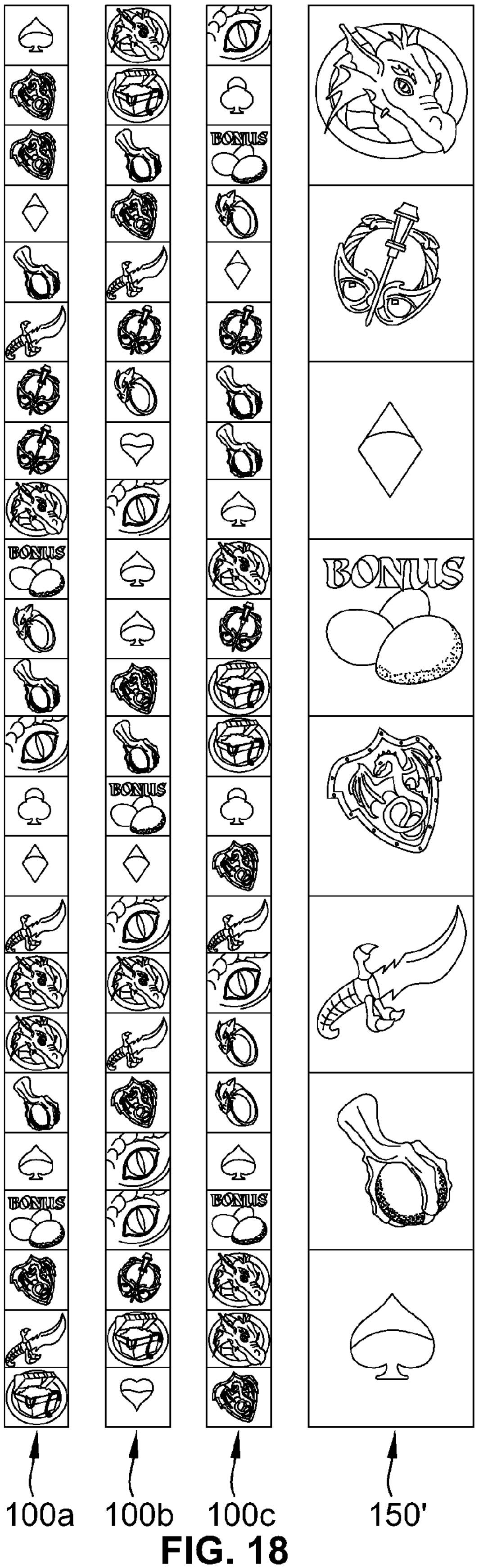
FIG. 18 is an image of a representation of the example of reel strips shown in FIGS. 16-17, depicting at least some aspects of an embodiment according to the present concepts.

Using the reel symbols described and shown above and herein, a representation of conventional reel strips is shown in FIG. 15. By way of comparison, FIG. 16 shows a representation of an example of at least a portion of reel strips in accord with at least some concepts disclosed herein. Reels 100*a*-100*e* are shown in FIG. 16. The last two reels 100*d*-100*e* are shown to have the same symbols in the same symbol positions. For example, at the top of the reels 100*d*-100*e*, the top three symbol positions are each shown to bear a "DRAGON" symbol. Continuing downward along the reel strips, reels 100*d*-100*e* show that the next group of three symbols comprise "BROOCH" symbols in each of the next three symbol positions. This sequence of clumps of three symbols in three adjoining symbol positions continues in the depicted example. As can be seen in FIGS. 17-18, any symbol, including the "BONUS" symbols, may be the object of a meta-symbol.

As used herein, the term meta-symbol may refer to an enlarged symbol occupying laterally adjacent symbol positions across a plurality of reels (e.g., adjacent reel-strips having a mixture of separate regular reel symbols and at least one meta-symbol common to the reels, etc.) and which may occupy one or more adjacent rows across the plurality of reels. The term meta-symbol may alternatively refer to an enlarged symbol occupying a single enlarged reel symbol position on an enlarged reel (e.g., a reel-strip entirely populated by meta-symbols, etc.), presented in combination with one or more other, smaller conventional reels. As to the above-noted descriptions of meta-symbols, the meta-symbol may be displayed at any time before, during and/or after a spin. FIGS. 4-5, for example, shows an example wherein the meta-symbol is optionally displayed both during the reel spin (FIG. 4) and subsequent to the stopping of the reel(s). In yet another alternative aspect, the term meta-symbol may alternatively refer to an enlarged symbol occupying vertically adjacent symbol positions across a single reel, where the enlarged symbol is displayed both during the reel spin and subsequent to the stopping of the reel.

FIG. 17 shows one way in which the meta-symbol (e.g., meta-symbol 150 in FIG. 5) may be represented or formed. The separate reel strips 100*d*-100*e* from FIG. 16 are shown on the left of FIG. 17. On the right side of FIG. 17 is shown an enlarged reel strip 150' comprising meta-symbols 150 in symbol positions 150*a*-150*h*, which are, top to bottom, "DRAGON," "BROOCH," "DIAMOND", "BONUS," "SHIELD," "KNIFE," "CLAW ORB," and "SPADE," respectively. Thus, the top three "DRAGON" symbols on reel 100*d* combine with the top three "DRAGON" symbols on reel 100*e* to form, in the new enlarged reel strip 150', the "DRAGON" meta-symbol. FIG. 18 shows the view of the reel strips as they are presented to the player during play of the wagering game, showing reels 100*d*-100*e* as a single reel 150' bearing meta-symbols. Of course, the unwrapped reel strip depictions in FIGS. 16-18 are merely examples to illustrate at least some concepts disclosed herein and in commercial embodiments the reel strips could comprise any number of symbol positions (e.g., 30, 40, 50, 60, 100, etc.) in accord with the mathematical model of a particular wagering game.

Further, it bears noting that it is not necessary that the reel strips be identical as is shown by way of example in FIGS. 16-17. Instead, the reel strips selected to combine to form at least one meta-symbol may comprise a combination of uniform symbols (i.e., the same symbol on laterally adjacent symbol positions in the reel strips, particularly repeated or clumped symbols) and non-uniform symbols, with the uniform symbols being combined to form meta-symbols (e.g., a 1×2 meta-symbol, a 2×2 meta-symbol, a 3×3 meta-symbol, etc.). Thus, as one example, a plurality of the same or different conventional symbols may interspersed between meta-symbols (e.g., in reels 100*d*-100*e* in FIG. 17, not all of the conventional symbols need be converted to meta-symbols). As another example, smaller meta-symbols (e.g., 1×2) may be interspersed between larger meta-symbols (e.g., 2×2). Further, in accord with any aspects described herein, the meta-symbols may comprise any plurality of adjacent symbol positions and may occupy two, three, four, or even five (or more) reels and may occupy any number of rows of such reels (e.g., a 1×4 array, a 1×5 array, a 2×3 array, a 4×4 array, etc.).

Figure 6:
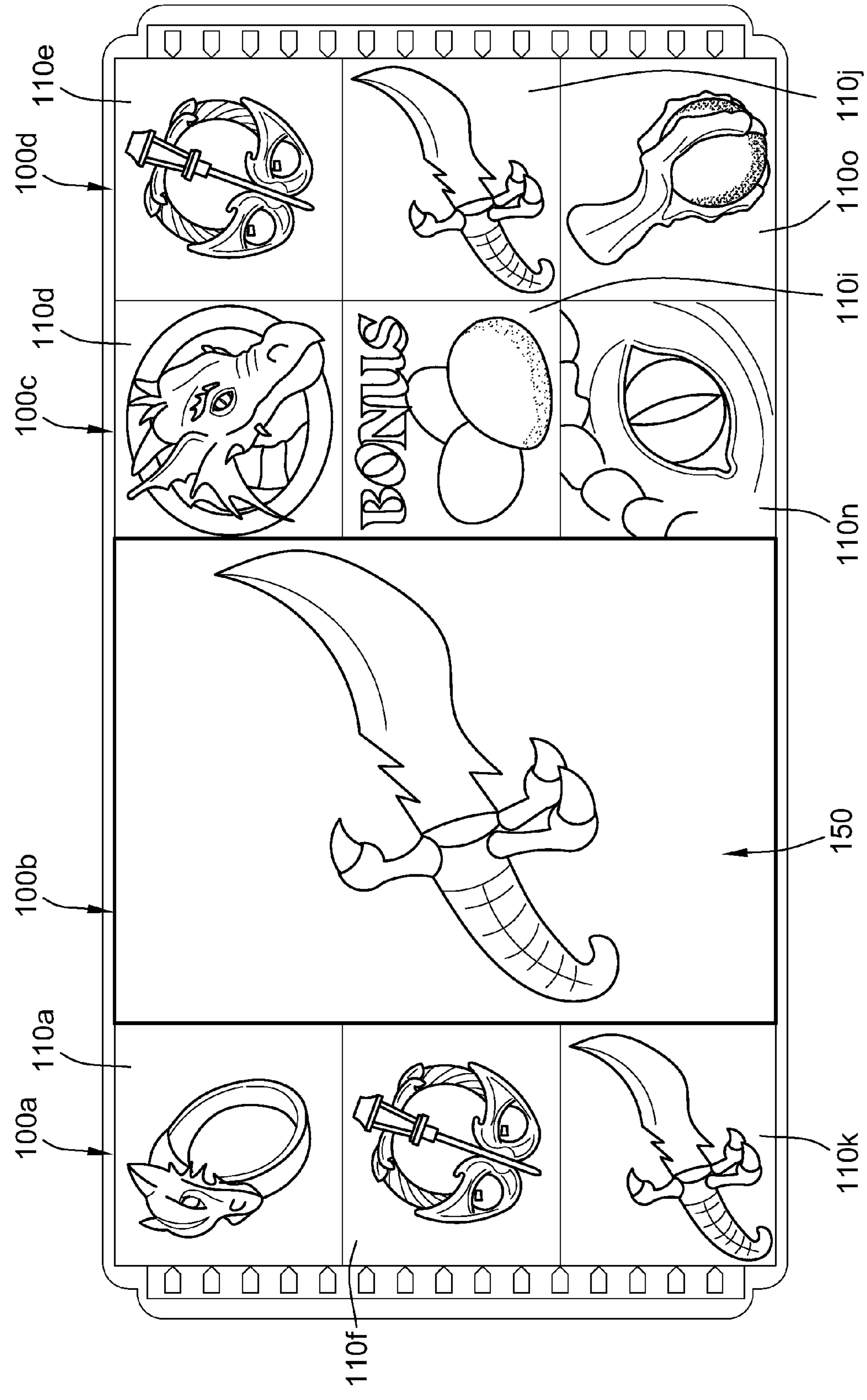
FIG. 6 is an image of another example of a wagering game screen depicting at least some aspects of an embodiment according to the present concepts.
Figure 7:
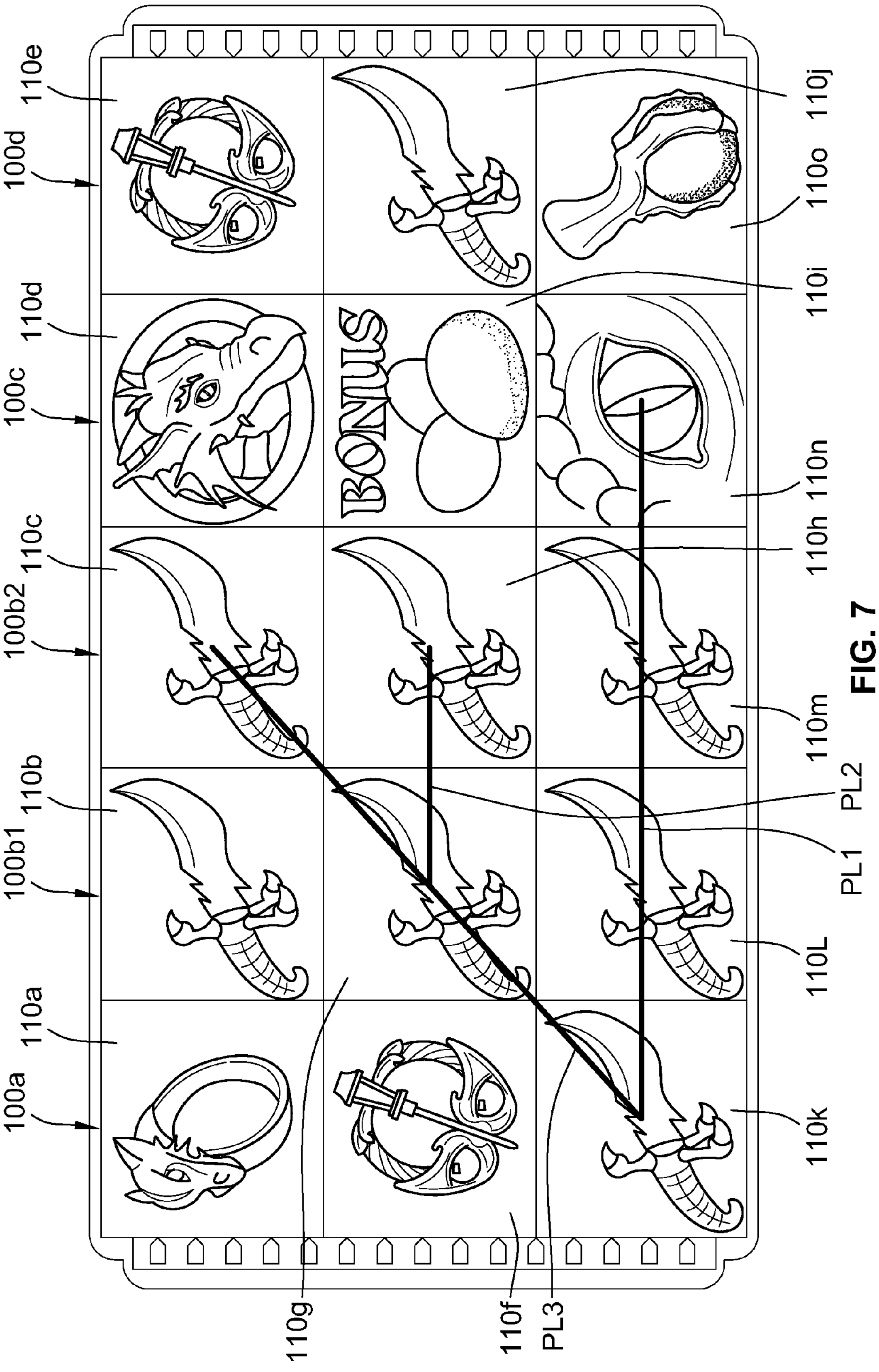
FIG. 7 is a modified image of the wagering game screen of FIG. 6, depicting winning combinations of symbols consistent with at least some aspects of an embodiment according to the present concepts.

In accord with at least some aspects of the present concepts, the reel strips, such as those shown by way of example in FIG. 16, are not assigned predetermined lateral positions. Prior to or concurrent with the initiation of a wagering game, the controller(s) 42 randomly determine(s), on every spin, two adjacent reel strips (e.g., reels 1-2, reels 2-3, reels 3-4, reels 4-5, reels 5-1, etc.) that are to bear and display one or more meta-symbols. In the example of FIGS. 4-5, reels 4-5 are represented by an enlarged reel 100*d*. In the example of FIGS. 6-7, reels 2-3 are represented by enlarged reel 100*b*. In a subsequent spin, reels 4-5 (e.g., reels 100*c*, 100*d* in FIG. 6) may be represented by an enlarged reel bearing at least one meta-symbol. In still another subsequent spin, reels 3-4-5 may be represented by an enlarged reel bearing at least one meta-symbol.

In accord with such aspects, the player does not know, from turn-to-turn, which reels will bear the meta-symbol. From the players' perspective, it is preferable for reels 1-2 (e.g., reels 100*a*-100*b* in FIG. 4) to be associated with the meta-symbol (s) as this would increase the probability of winning outcomes for the player. The meta-symbol(s) 150, visually distinguishable by players even during the blurred motion of the reels prior to stopping of the reels to reveal the outcome, telegraph to the player that the likelihood of a winning outcome is improved, particularly should the meta-symbol(s) appear in reels 1-2 (e.g., reels 100*a*-100*b* in FIG. 4) or reels 2-3 (e.g., reels 100*b*-100*c* in FIG. 4). Thus, in relation to FIG. 4, as the reel strips 100*a*-100*d* spin, the large meta-symbol(s) 150 associated with reel 100*d* are more discernable to the player than are the conventionally sized symbols during such spinning of the reels. The meta-symbol(s) 150 not only provide an impressive look, while moving or stationary, but can also serve to heighten the player's anticipation of winning outcomes. In some aspects, meta-symbol(s) 150 may be associated with a lower hit rate to compensate for larger wins that may be associated therewith.

In accord with at least some aspects of the present concepts, a meta-symbol that includes more than one row of symbol positions (e.g., a 2×2 meta-symbol, a 3×3 meta-symbol, a 3×2 meta-symbol, etc.) may stop partially within the wagering game display (e.g., primary display 14). For example, the "CLAW" meta-symbol and the "TREASURE" meta-symbol of FIG. 5 could stop in the position indicated by the blurred symbol, such that only a bottom portion of the "CLAW" meta-symbol is showing in the display and only a top portion of the "TREASURE" meta-symbol is showing in the display. In such an outcome, the meta-symbol may optionally be separated out into separate symbols in separate symbol positions if the separate symbols in separate symbol positions would contribute to a winning outcome. Thus, were a partially displayed "CLAW" meta-symbol represented in reel 100*d* of FIG. 5 able to contribute to a winning outcome (e.g., "CLAW" symbols associated with symbol positions 110*a*-110*c* in a subsequent spin along an active payline therethrough), the "CLAW" meta-symbol represented in reel 100*d* could be separated out into two separate conventional "CLAW" symbols for evaluation with the other "CLAW" symbols. Alternatively, without altering the "CLAW" meta-symbol, the controller 34 could simply be configured to recognize and treat the "CLAW" meta-symbol as two conventional "CLAW" symbols in such example.

Although FIG. 17 shows one way in which the meta-symbols (e.g., meta-symbol 150 in FIG. 5) may be formed, in another embodiment one or more meta-symbols may be borne by a designated enlarged reel or reel strip. This designated reel or reel strip may be fixed, always in the same location relative to the remaining reels or reel strips, or variable, randomly moving location relative to the remaining reels or reel strips.

The present concepts also may be adapted to companion gaming, wherein peripheral reels (e.g., reels 1, 5), and possibly interior reels (reels 2, 3, 4) of a first wagering game machine 10*a* may be linked to peripheral reels (e.g., reels 1, 5) and/or interior reels (reels 2, 3, 4) of a second wagering game machine 10*b* or any number of additional wagering game machines. Thus, reel 1 on wagering game machine 10*a* could be linked with reel 5 on a second wagering game machine 10*b* to the left of wagering game machine 10*a* and/or reel 5 on wagering game machine 10*a* could be linked with reel 1 on a third wagering game machine 10*c* to the right of wagering game machine 10*a*. In another example, reel 1-2 on wagering game machine 10*a* could be randomly selected to be replaced with an enlarged reel, such as would correspond to the reel strip 150' bearing meta-symbols 150 shown in FIG. 17, and contemporaneously at one or more other selected wagering game machines (e.g., a pre-determined selection, a selection by a particular relationship with the player at wagering game machine 10*a*, a selection by a triggering event, a selection by a triggering event coupled with a qualification condition, etc.), reels 1-2 on those wagering game machines 10*b*-10*n* would also be replaced with an enlarged reel, which may be the same as or different than the enlarged reel(s) in any of the other linked wagering game machines.

FIGS. 6-7 show another example of an array of symbol positions following a reveal of a wagering game outcome. In FIG. 6, a "KNIFE" meta-symbol 150 is prominently shown on reel 100*b*. In the remaining reels, reel 110*a* shows a "RING" symbol in symbol position 110*a*, a "BROOCH" symbol in symbol position 110*f*, and a "KNIFE" symbol in symbol position 110*k*. Reel 100*c* shows a "DRAGON" symbol in symbol position 110*d*, a "BONUS" symbol in symbol position 110*i*, and a "EYE" symbol in symbol position 110*n*. Reel 100*d* shows a "BROOCH" symbol in symbol position 110*e*, a "KNIFE" symbol in symbol position 110*j*, and a "CLAW" symbol in symbol position 110*o*. FIG. 7 shows that the reel 100*b* bearing the "KNIFE" meta-symbol 150 is separated into two reels, 100*b*1 and 100*b*2, all of the symbol positions previously being occupied with the meta-symbol 150 being replaced with a conventional corresponding symbol, here the "KNIFE" symbol. Thus, as shown in FIG. 7, reel 100*b*1 comprising symbol positions 110*b*, 100*g*, and 110*l*, each bearing a "KNIFE" symbol, and reel 100*b*2 comprising symbol positions 110*c*, 100*h*, and 110*m*, each bearing a "KNIFE" symbol.

FIG. 7 further shows that the array of symbol positions 110*a*-110*o* is evaluated for winning combinations according to a pay table. As shown, three active paylines PL1-PL3 are indicated as winning paylines as each of paylines PL1-PL3 comprises three "KNIFE" symbols.

Figure 8:
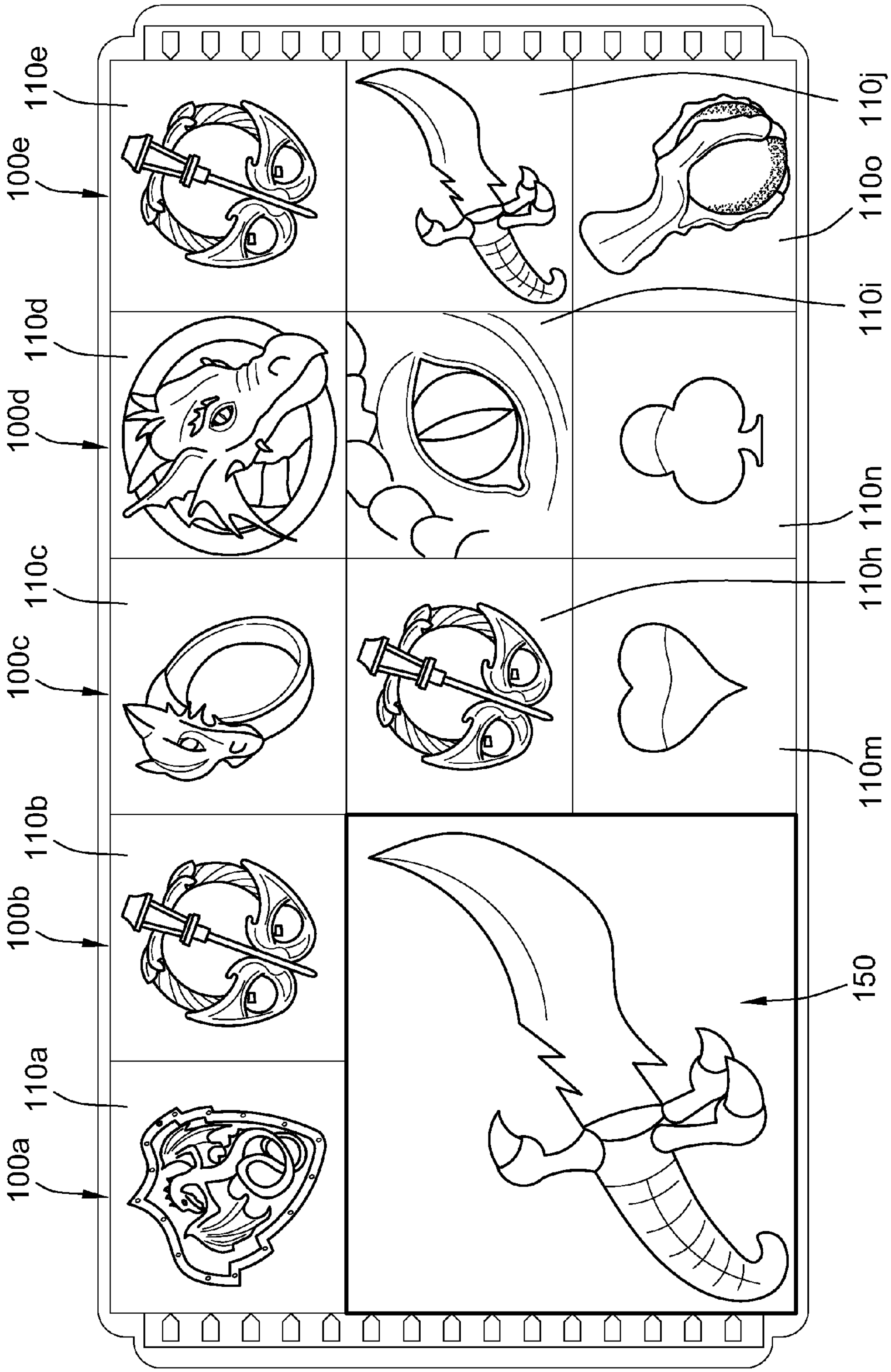
FIG. 8 is an image of another example of a wagering game screen depicting at least some aspects of an embodiment according to the present concepts.

FIG. 8 shows another example in accord with at least some aspects of the present concepts. In this example, the meta-symbol 150, here a "KNIFE" symbol, occupies a 2×2 array of symbol positions, in contrast to the meta-symbol 150 occupying a 3×3 array of symbol positions as shown in FIGS. 5-6, for example. As shown, reel 110*a* shows a "SHIELD" symbol in symbol position 110*a* and reel 100*b* shows a "BROOCH" symbol in symbol position 110*b*. Although reels 100*a* and 100*b* are described as separate in this example, the reels 100*a*, 100*b* may be treated as a single reel during the spinning of the reel bearing the meta-symbol 150. Reel 100*c* shows a "RING" symbol in symbol position 110*c*, a "BROOCH" symbol in symbol position 110*h*, and a "HEART" symbol in symbol position 110*m*. Reel 100*d* comprises a "DRAGON" symbol in symbol position 110*d*, a "EYE" symbol in symbol position 110*i*, and a "CLUB" symbol in symbol position 110*n*. Reel 100*e* comprises a "BROOCH" symbol in symbol position 110*e*, a "KNIFE" symbol in symbol position 110*j*, and a "CLAW" symbol in symbol position 110*o*. Unlike the example of FIGS. 6-7, following the display of the meta-symbol 150 in FIG. 8, the meta-symbol is not separated out into four separate "KNIFE" symbols in symbol positions 110*f*, 110*g*, 110*k* and 110*l*, as no winning outcomes are associated with that array in this example. Accordingly, it is not necessary to separate and divide the meta-symbol 150 as it would not, for example, enhance a player's understanding of any particular winning outcome. Optionally, the meta-symbol 150 could nonetheless be subsequently separated into four separate "KNIFE" symbols in symbol positions 110*f*, 110*g*, 110*k* and 110*l*.

Figure 9:
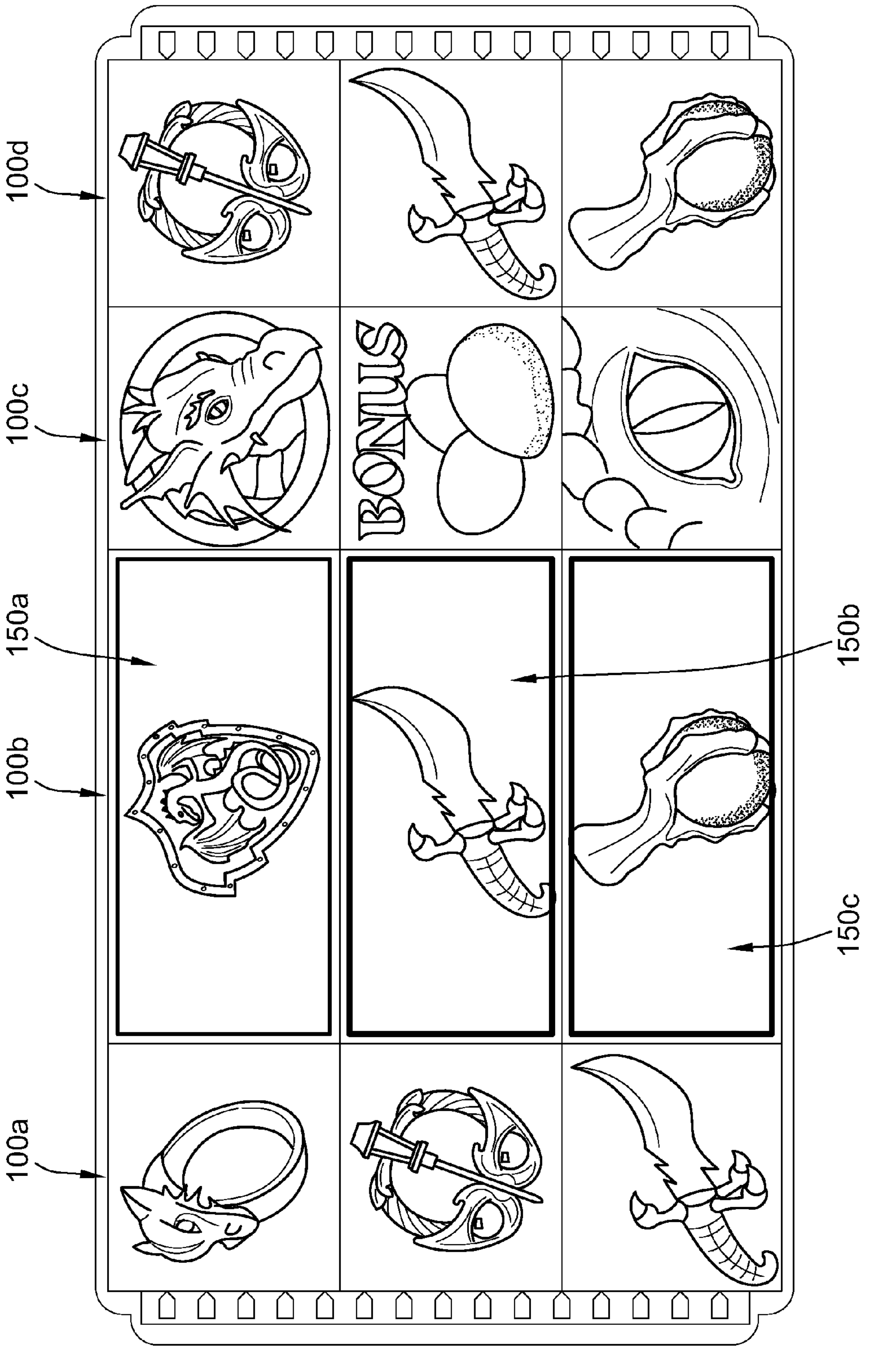
FIG. 9 is an image of yet another example of a wagering game screen depicting at least some aspects of an embodiment according to the present concepts.
Figure 10:
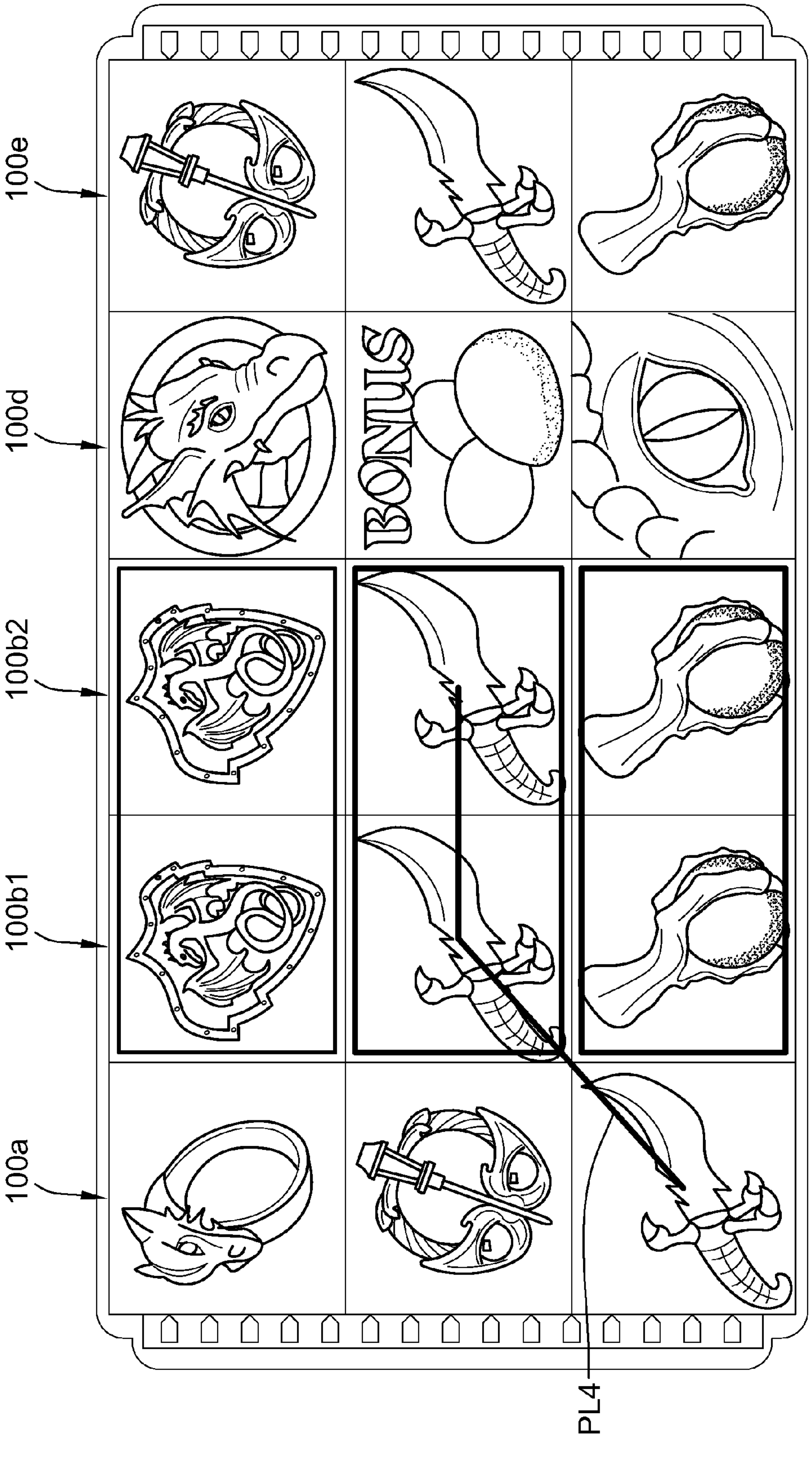
FIG. 10 is a modified image of the wagering game screen of FIG. 9, depicting winning combinations of symbols consistent with at least some aspects of an embodiment according to the present concepts.

FIGS. 9-10 show still another example of an array of symbol positions following a reveal of a wagering game outcome. In FIG. 9, a "SHIELD" meta-symbol 150*a* is shown in the top position on reel 100*b*, a "KNIFE" meta-symbol 150*b* is shown in the middle position on reel 100*b*, and a "CLAW" meta-symbol 150*c* is shown in the bottom position on reel 100*b*. At the symbol position (not numbered) at the bottom of reel 100*a*, a "KNIFE" symbol is shown. In FIG. 10, the "KNIFE" meta-symbol 150*b* is separated out into two separate "KNIFE" symbols and reel 100*b* is separated out into two separate reels 100*b*1 and 100*b*2, each with a symbol position corresponding to one of the "KNIFE" symbols from the meta-symbol 150*b*. Payline 4 (PL4) is shown to pass through the three "KNIFE" symbols in reels 100*a*, 100*b*1, 100*b*2, signifying a winning outcome. The "SHIELD" meta-symbol 150*a* is shown to have been separated out into two separate "SHIELD" symbols and reel in reels 100*b*1 and 100*b*2, each with a symbol position corresponding to one of the "SHIELD" symbols from the meta-symbol 150*a*. The "CLAW" meta-symbol 150*c* is shown to have been separated out into two separate "CLAW" symbols and reel in reels 100*b*1 and 100*b*2, each with a symbol position corresponding to one of the "CLAW" symbols from the meta-symbol 150*c*, although this representation of the "SHIELD" and "CLAW" symbols is entirely optional as these meta-symbols are shown not to contribute to any winning outcome.

Figure 11:
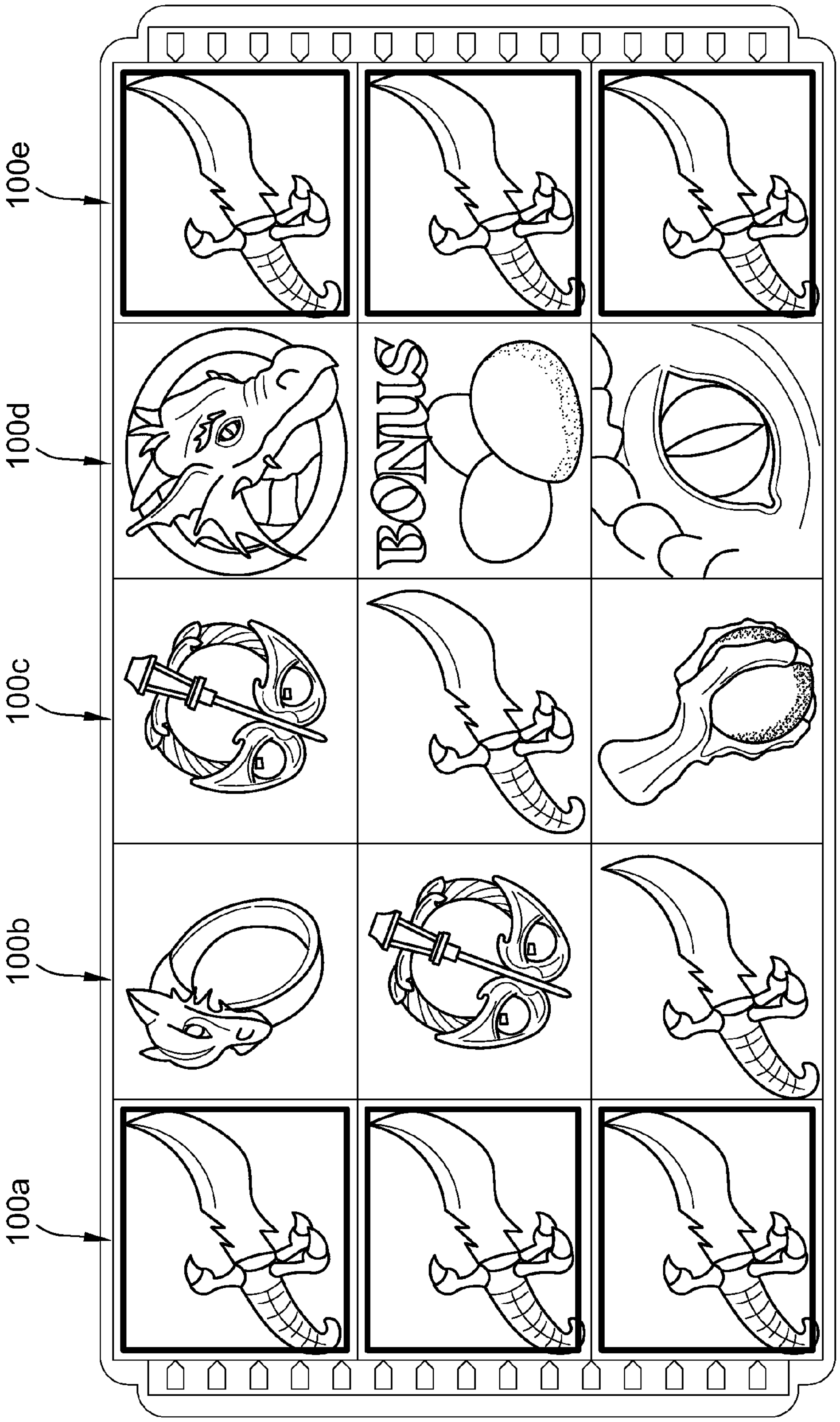
FIG. 11 is another example of a wagering game screen depicting at least some aspects of an embodiment according to the present concepts.

FIG. 11 shows still another variant in accord with the present concepts. Reels 100*a*-100*e* are shown, wherein the symbol positions (top, middle, bottom) of reel 100*a* are each associated with a "KNIFE" symbol and the symbol positions (top, middle, bottom) of reel 100*e* are also each associated with a "KNIFE" symbol. In accord with at least some aspects of the present concepts, reels 100*a* and 100*e* are considered to be adjacent and the "KNIFE" symbols displayed in each symbol position of reels 100*a* and 100*e* represents a meta-symbol (not shown) that spanned from reel 100*e* to 100*a*. By way of example, the treatment of reels 100*a* and 100*e* as being adjacent, or for that matter, reels 100*a*-100*b* and 100*e*, may be contextually aligned with the disclosure of U.S. Pat. No. 7,618,315, titled "WAGERING GAME WITH WRAP-AROUND PAYLINES," which is assigned to WMS Gaming Inc. and which is hereby incorporated by reference in its entirety. For example, reel 5 (e.g., reel 100*e* in FIG. 11) could be treated as reel 1 and reel 1 treated as reel 2, and so on. The meta-symbol may or may not be shown as an enlarged meta-symbol (e.g., occupying separately each of reels 100*a*, 100*e*). In accord with at least some aspects of the invention, it is not necessary that one or more meta-symbols in fact be used to graphically represent, for example, the clumped symbols shown in FIGS. 16-17. Instead, aspects of the present concepts not logically requiring such meta-symbols can be implemented in the manner shown in FIG. 11, with the clumped symbols being shown as indicated by the reel strip strips shown in FIG. 16, rather than as modified in FIG. 17.

Figure 12:
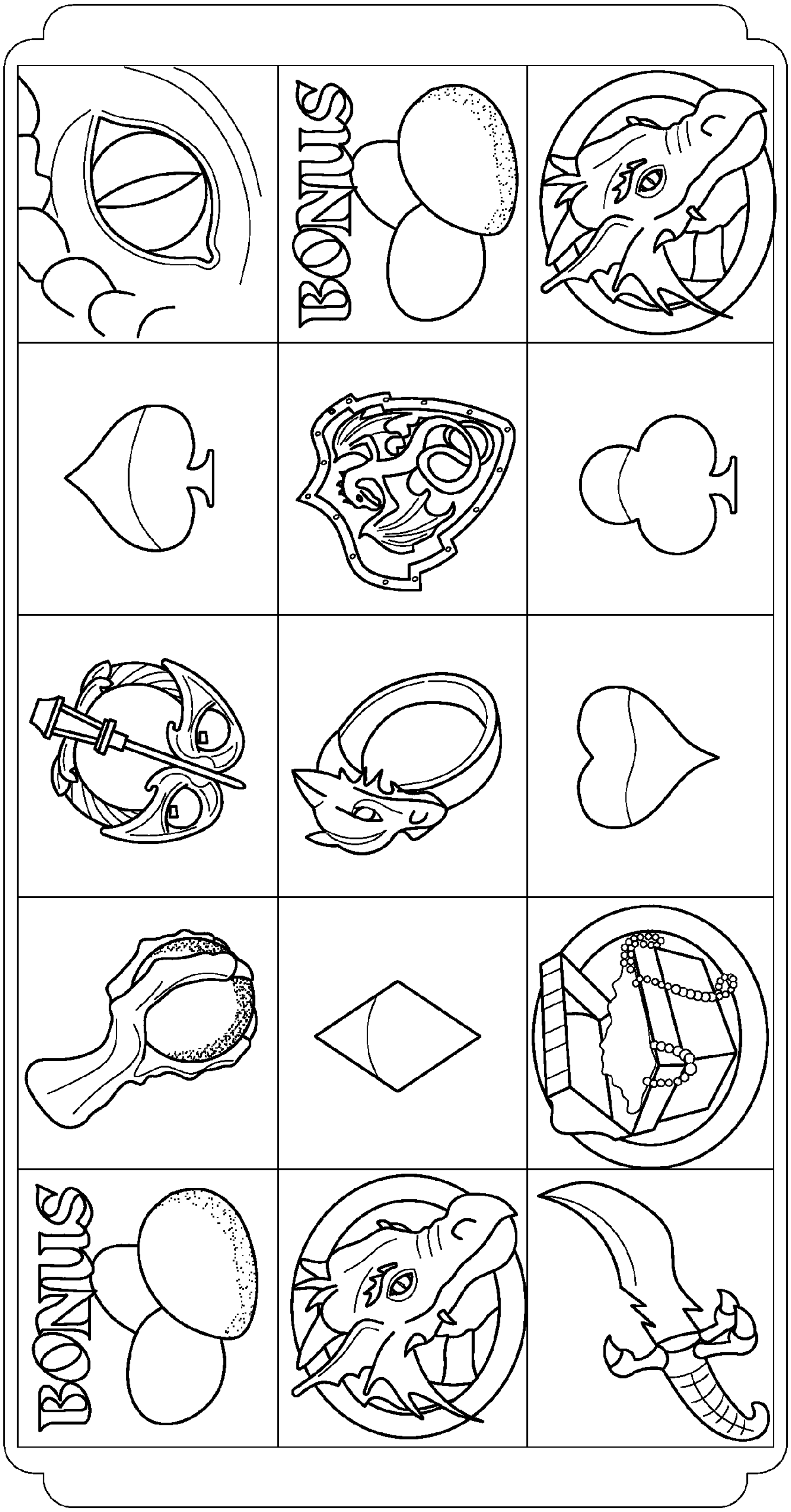
FIGS. 12-14 present images of examples of wagering game screens collectively representing at least some aspects of an embodiment according to the present concepts.
Figure 13:
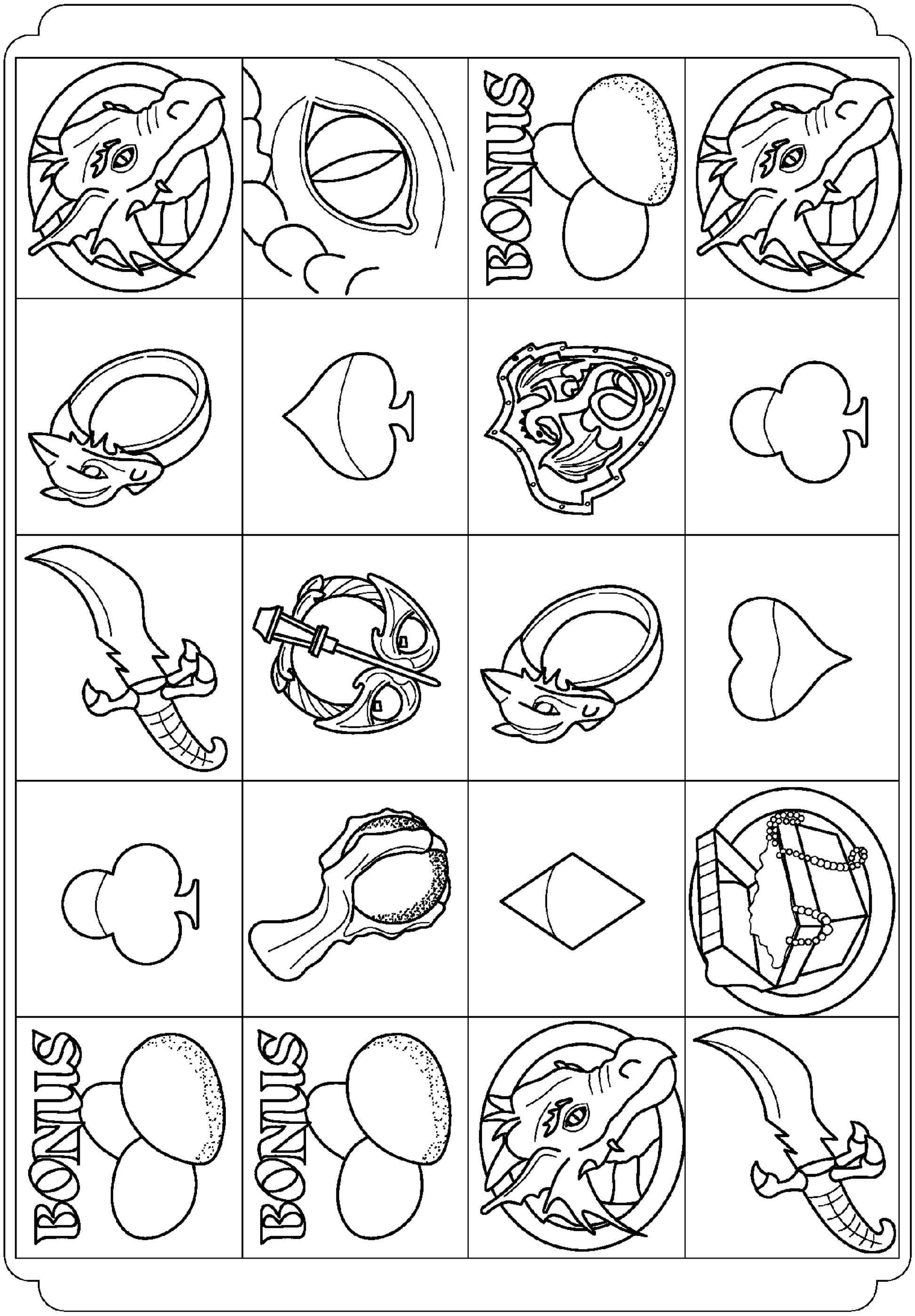
Figure 14:
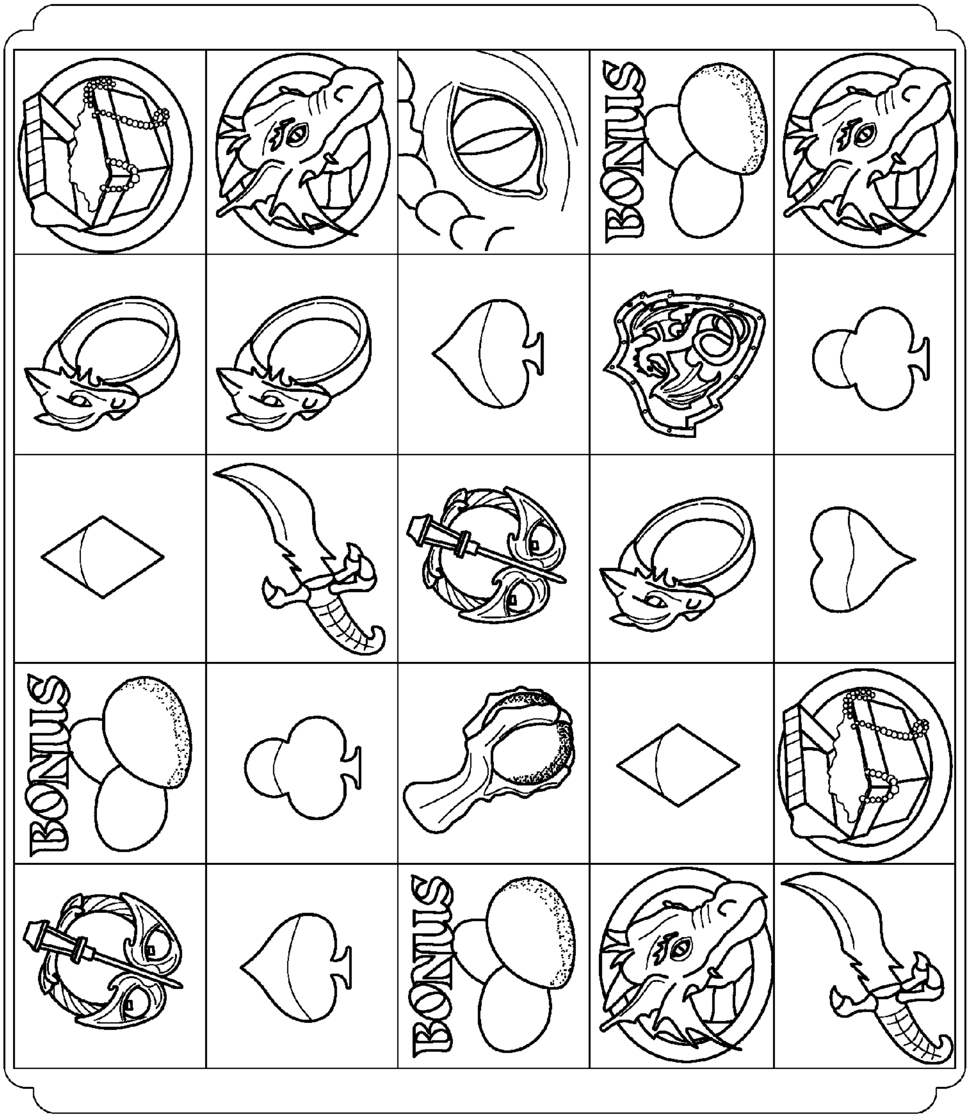

FIGS. 12-14 show still additional aspects of the present concepts. FIG. 12 shows a 3×5 array of symbol positions and associated symbols. FIG. 13 shows a 4×5 array of symbol positions and associated symbols. FIG. 14 shows a 5×5 array of symbol positions and associated symbols. Absent from the displayed arrays are payline indicators. In the example of FIGS. 12-14, a random array expansion is depicted wherein the structure of the array is automatically adjusted to correspond to a level of the wager. In accord with such embodiment, the size of the reels or, stated differently, the number of symbol positions in play, increases with increased wagers such that, in effect, the number of paylines to a player increases in correspondence with the increased number of rows and columns in the array. Purely by way of example, FIG. 12 could correspond to 30 paylines, FIG. 13 could correspond to 50 paylines, and FIG. 14 could correspond to 100 paylines. A payline meter (not shown) could also indicate to the player the number of paylines corresponding to a prospective and/or an entered wager.

Thus, in accord with the embodiment represented by FIGS. 12-14, as the player inputs larger wager amounts, the structure of the reels can be configured to contemporaneously morph to comport with the level of the input wager. From play to play, the player may alter the amount of the wager and the reel configuration would change accordingly. For example, in one sequence, the player inputs a desired wager and the reels morph into a structure providing a number of paylines suitable for the input wager. A player inputting a $0.50 wager would be presented with a different array of possible outcomes than would a player inputting a $5.00 wager. The reels then spin and stop and a payout is provided if a winning outcome, a predetermined symbol or combination of symbols in a predetermined arrangement on the reels, is indicated by the reels.

Although the arrays depicted in FIGS. 12-14 are symmetric arrays in that each column has the same number of rows, the embodiment of FIGS. 12-14 does not require such symmetry. For example, the number of rows in one or more reels could be greater than or less than the number of rows in one or more other reels. Thus, the structure of the reels could morph into, for example, a 3-4-3-4-3 or 4-3-4-3-4 array, wherein the order of the number in the sequence denotes the reel number (e.g., reel 1, reel 2, reel 3, reel 4, reel 5) and the indicated number indicates the number of rows. In accord with some wagers, reels 1-2 could comprise, for example, two rows, with each of reels 3-5 comprising 5 rows. In yet another configuration, the symbol positions may be altered to be staggered from one another.

Further, the concepts described above in relation to FIGS. 12-14 may be combined with the meta-symbol concepts disclosed herein. By way of example, an enlarged reel 150' comprising meta-symbols may be included in the indicated array even for minimal wagers. Alternatively, a predetermined minimum wager may be required to activate an enlarged reel 150' and/or symbol positions comprising one or more meta-symbols 150. In still other aspects, higher wagers may increase a number of symbol positions associated with meta-symbols.

Each of these embodiments and obvious variations thereof is contemplated as falling within the spirit and scope of the claimed invention, which is set forth in the following claims. For example, in one variation, in lieu of the reel-based examples and video reel based examples noted above, the each symbol position may itself be treated as a separate video reel and the use of meta-symbols as described herein applied in constituent part to each individual symbol position so that, in the aggregate, the display of the meta-symbols is retained. In still additional aspects, although reference is made herein to symbol positions arranged in arrays, it is not required that symbol positions be arranged in an array and other distributions of symbol positions are contemplated as falling within the present concepts such as, but not limited to, staggered presentations of symbol positions. In yet another additional aspect, a wagering game machine may comprise a plurality of reel strips, only a subset of the reel strips being shown in any given game, and the plurality of reel strips comprising at least one enlarged reel bearing meta-symbols. In such aspect, the controller randomly determines for a particular game, both an outcome and the subset of the reel strips that are to be used to display the outcome. Accordingly, an enlarged reel bearing one or more meta-symbols would not be displayed in every wagering game. In related aspects, increased wagers, such as a Max Bet wager, may provided enhanced odds of encountering the enlarged reel bearing one or more meta-symbols.

Still further, the present concepts include any computer program product bearing instructions configured to cause, upon execution by a controller, the acts defined by the concepts described herein. For example, in at least some aspects, a player may be able to select a symbol or symbols that form one or more meta-symbols prior to the spinning of the reels (e.g., to select a "lucky" symbol). As another example, the meta-symbol may comprise a wild symbol. In yet another example, the meta-symbol may comprise a combination of two separate symbols. In still another example, the meta-symbol may comprise a morphed symbol comprising a combination of two separate symbols (e.g., an altered form of two symbols).

What is claimed is:

1. A method for conducting a wagering game on a gaming system configured to display a wagering game outcome on a plurality of reels associated with a gaming system display, the method comprising the acts of:

receiving a wager via a wager input device;

using one or more processors, randomly determining the wagering game outcome, using the one or more processors, or another processor, displaying the wagering game outcome on the plurality of reels, the wagering game outcome comprising a plurality of symbols borne by a first subset of the plurality of reels and further comprising at least one meta-symbol borne by a second subset of the plurality of reels so as to rotate with the second subset of the plurality of reels;

awarding an award if the displayed wagering game defines a winning wagering game outcome, wherein the second subset of the plurality of reels comprising the at least one meta-symbol is randomly determined every spin so as to be independent of a prior spin, and wherein the meta-symbol is displayed both while spinning of the second subset of the plurality of reels and following stopping of the second subset of the plurality of reels to display the plurality of symbols thereon in association with the wagering game outcome.

2. The method of claim 1, further comprising:

altering the display of the meta-symbol prior to the act of awarding to display on the second subset of the plurality of reels a plurality of symbols corresponding to the meta-symbol.

3. The method of claim 1, wherein the meta-symbol is discernable in the display during spinning of the second subset of the plurality of reels.

4. The method of claim 1, further comprising:

randomly determining a location of the second subset of the plurality of reels relative to the first subset of the plurality of reels prior to or concurrent with initiation of a wagering game.

5. The method of claim 1, wherein the plurality of reels are video reels.

6. A gaming system for playing a wagering game, comprising:

a display configured to displaying a wagering game outcome on a plurality of video reels; and a controller in communication with the display, the controller being operative to randomly determine an outcome of the wagering game, display the wagering game outcome on the plurality of reels, the wagering game outcome comprising a plurality of symbols borne by a first subset of the plurality of reels and further comprising at least one meta-symbol borne by a second subset of the plurality of reels; and award an award if the displayed wagering game defines a winning wagering game outcome, wherein the second subset of the plurality of reels comprising the at least one meta-symbol is randomly determined every spin so as to be independent of a prior spin, and wherein the meta-symbol borne by the second subset of the plurality of reels is displayed both while spinning of the second subset of the plurality of reels and following stopping of the second subset of the plurality of reels to display the plurality of symbols thereon in association with the wagering game outcome.

7. The gaming system of claim 6, wherein the controller is further operative to:

alter the display of the meta-symbol prior to the awarding of the award to display, on each of the reels in the second subset of the plurality of reels, a symbol corresponding to the meta-symbol.

8. The gaming system of claim 6, wherein the second subset of the plurality of reels comprises a single, enlarged reel.

9. The gaming system of claim 6, wherein the meta-symbol is discernable in the display during spinning of the second subset of the plurality of reels.

10. The gaming system of claim 6, wherein the controller is further operative to:

randomly determine a location of the second subset of the plurality of reels relative to the first subset of the plurality of reels prior to or concurrent with initiation of a wagering game.

11. A gaming system for playing a wagering game, comprising:

a video display configured to displaying a wagering game outcome comprising a plurality of symbol positions bearing symbols; and a controller in communication with the display, the controller being operative to receive a wagering input;

alter the video display to increase or decrease a number of displayed symbol positions in correspondence with the wagering input, the number of displayed symbol positions being influenced by a level of the wagering input;

randomly determine an outcome of the wagering game for the displayed symbol positions;

display the wagering game outcome; and award an award for any indicated winning wagering game outcome.

12. The gaming system of claim 11, wherein the plurality of symbol positions correspond to symbol positions on a plurality of video reels.

13. The gaming system of claim 12, wherein at least one of the video reels comprises at least one meta-symbol.

14. The gaming system of claim 12, wherein at least one symbol position is configured to display a meta-symbol.

15. The gaming system of claim 12, wherein at least one of the video reels is an enlarged reel comprising at least one meta-symbol.

16. A gaming system for playing a wagering game, comprising:

a video display configured to displaying a wagering game outcome comprising a plurality of symbol positions bearing symbols; and a controller in communication with the display, the controller being operative to receive a wagering input;

alter a number of reels in play in the wagering game to increase or decrease a number of reels displayed on the display in correspondence with the wagering input, the number of reels displayed being directly influenced by a level of the wagering input;

randomly determine an outcome of the wagering game for the displayed reels;

display the wagering game outcome; and award an award for any indicated winning wagering game outcome.

17. A gaming system for playing a wagering game, comprising:

a display configured to displaying a wagering game outcome on a plurality of reels;

a controller in communication with the display, the controller being operative to randomly determine an outcome of the wagering game, display the wagering game outcome on the plurality of reels, the wagering game outcome comprising a plurality of symbols disposed on a first subset of the plurality of reels and further comprising at least one meta-symbol borne by a second subset of the plurality of reels, the second subset of reels comprising a plurality of adjacent reels spinning and stopping synchronously with the at least one meta-symbol spanning at least one symbol position on each reel in the second subset of reels; and award an award if the displayed wagering game defines a winning wagering game outcome, wherein the second subset of the plurality of reels bearing at least one meta-symbol is randomly determined every spin so as to be independent of a prior spin.

18. The gaming system of claim 17, wherein the controller is further operative to:

alter the display of the meta-symbol prior to the awarding of the award to display, on each of the reels in the second subset of the plurality of reels, a symbol corresponding to the meta-symbol.

19. The gaming system of claim 17, wherein the meta-symbol is discernable in the display during spinning of the second subset of the plurality of reels.

20. The gaming system of claim 17, wherein the controller is further operative to:

randomly determine a location of the second subset of the plurality of reels relative to the first subset of the plurality of reels prior to or concurrent with initiation of a wagering game.

* * * * *